United States Patent Office 2,970,947
Patented Feb. 7, 1961

2,970,947

PROCESS OF PRODUCING AN ANTIBIOTIC OF THE TETRACYCLINE SERIES

Jerry Robert Daniel McCormick, New City, Nancy Hazlett Arnold and Ursula Hirsch, Pearl River, and Philip Andrew Miller, New City, N.Y., and Newell Oscar Sjolander, Saddle River, N.J., assignors to American Cyanamid Company, New York, N.Y., a corporation of Maine No Drawing. Original application June 20, 1958, Ser. No. 743,424. Divided and this application Mar. 12, 1959, Ser. No. 798,857

5 Claims. (Cl. 195—80)

This application is a division of our copending application Serial No. 743,424, filed June 20, 1958.

This invention relates to a novel process of producing an antibiotic of the tetracycline series and more particularly is concerned with an improved process of fermenting microorganisms of the genus Streptomyces which produce such tetracycline antibiotics in the presence of a substance designated cosynthetic factor-1, hereinafter sometimes referred to as CF–1, which has the property of stimulating the production of high concentrations of the tetracycline antibiotics.

In the copending application of John A. Growich and Philip A. Miller, Serial No. 650,821, filed April 5, 1957, there are described and claimed certain new compounds related to the tetracyclines which have been designated 5a(11a)-dehydrotetracyclines [see also J.A.C.S., 80, 5572 (1958)]. The 5a(11a)-dehydrotetracyclines are produced by certain strains of S. aureofaciens such as strain S1308, for example, the morphological and cultural characteristics of which are adequately described in the aforesaid copending application. In addition, viable cultures of S. aureofaciens, strain S1308, as well as several variants thereof have been deposited with the American Type Culture Collection in Washington, D.C., where they have been assigned ATCC Accession Numbers 12748–12751, inclusive. The 5a(11a)-dehydrotetracyclines are largely biologically inactive but they may be converted by a suitable catalytic reduction process to the well-known, broad-spectrum antibiotic tetracycline.

We have now discovered that when cosynthetic factor-1 is added to a fermentation medium inoculated with S. aureofaciens strain S1308 (ATCC No. 12748), for example, and the culture is grown under standard aerobic conditions, the amount of chlortetracycline produced is increased from about 100–400 micrograms per milliliter to more than 5,000 micrograms per milliliter. In this case, 5a(11a)-dehydrotetracycline is no longer produced. Just why the addition of cosynthetic factor-1 to the fermentation produces such a high concentration of chlortetracycline when that fermenation ordinarily produces only minimal amounts of chlortetracycline is not known with certainty, and no theory is advanced with respect thereto. It is known, however, that CF–1 is not a precursor as is shown by the fact that one microgram of CF–1 when added to a sufficient quantity of S. aureofaciens ATCC No. 12748 results in the biosynthesis of up to 57 milligrams of chlortetracycline beyond that normally produced under the same conditions.

Cosynthetic factor-1 is composed of the elements carbon, hydrogen, nitrogen and oxygen. Elementary analytical determinations of purified samples indicate elementary proportions by weight substantially as follows: carbon, 50.33%; hydrogen, 5.00%; nitrogen, 12.18%; oxygen (direct), 32.58%. The compound is of relatively low molecular weight, 340–360. The empirical formula based on the analytical values above corresponds closely to $C_{14-15}H_{17}N_3O_7$. The product is soluble in water at pH>6 and is soluble in phenol. It is insoluble in n-butanol, acetone, ether and in water at pH 1–2.

Cosynthetic factor-1 has an Rf value of 0.07 on a paper chromatogram developed with 1:1 n-butanol-water system and an Rf value of 0.28–0.35 in a 3:1:4 n-butanol-acetic acid-water system, and an Rf value of 0.30–0.40 in pH 10 ammonia-water system.

In a fifty tube Craig counter current distribution operation utilizing 1:1 phenol-chloroform as the organic phase and 0.1 N HCl as the aqueous phase, CF–1 appears as a single component with a peak concentration at tube 31.

An infrared absorption spectrum of a sample of the compound as obtained from dilute hydrochloric acid solution (acid form) when suspended in a potassium bromide pellet exhibits characteristic absorption in the infrared region of the spectrum at the following wave lengths expressed in microns: 2.84, 3.18, 3.35, 3.55, 5.91, 6.02, 6.27, 6.35, 6.49, 6.64, 6.72, 7.02, 7.18, 7.35, 7.49, 7.93, 8.16, 8.36, 8.69, 9.15, 9.30, 9.59, 9.77, 9.90, 10.11, 10.47, 11.40, 11.62, 11.81, 12.56, 12.83, 13.30 and 14.48.

The compound as obtained from pH 7 ammonium hydroxide solution (neutral form) when suspended in a potassium bromide pellet exhibits characteristic absorption in the infrared region of the spectrum at the following wave lengths expressed in microns: 3.12, 3.37, 3.55, 6.07, 6.33, 6.63, 7.00, 7.25, 7.44, 7.88, 8.13, 8.35, 8.73, 9.25, 9.55, 9.63, 9.84, 10.28, 10.42, 11.57, 11.75, 12.60, 12.96 and 14.50.

An ultraviolet absorption spectrum determined from a sample of the compound at a concentration of 10.7 micrograms per milliliter in 0.01 N HCl, shows characteristic absorption maxima at 230 m$\mu$, 250 m$\mu$, 267 m$\mu$ and 377 m$\mu$, corresponding to extinction coefficient values $$(E_{cm.}^{1\%})$$

of 1010, 580, 600 and 693, respectively.

An ultraviolet absorption spectrum determined from a sample of the compound at a cencentration of 10.7 micrograms per milliliter in 0.01 N NH$_4$OH shows characteristic absorption maxima at 248 m$\mu$, 268 m$\mu$, 295 m$\mu$ and 419 m$\mu$, corresponding to extinction coefficient values $$(E_{1\,cm.}^{1\%})$$

of 972, 684, 349 and 1215, respectively.

The organism that we prefer to use for the production of cosynthetic factor-1, because of its ability to produce larger amounts of this novel substance is a new strain of S. aureofaciens which we have designated as W–5.

The new strain is a member of the species S. aureofaciens since it is a direct descendant of the chlortetracycline-producing strain of S. aureofaciens A377 which was isolated from the soil and is described in the United States patent to Duggar No. 2,482,055, and the culture is deposited at the Northern Regional Research Laboratories, Peoria, Illinois, as NRRL 2209. Mutagenic agents and selective agents used in obtaining this new strain include ultraviolet irradiation, nicotine and nitrogen mustard treatments, and phase exposure.

Viable cultures of S. aureofaciens strain W–5 have been deposited with the American Type Culture Collection in Washington, D.C., where this strain has been assigned ATCC Accession Number 13,190.

The conditions for fermentation with the new strain of S. aureofaciens are generally the same as those presently used for cultivating other S. aureofaciens strains. That is, the fermentation medium contains the usual nutrients and essential mineral elements. Suitable substances which may provide the necessary nutrients include starch, dextrin, cane sugar, glucose, molasses, soybean meal, peanut meal, yeast, meat extracts, peptone, ammonium sulfate, urea, corn steep liquor, distillers solubles, fish meal and other conventional substances. The inorganic salts that may be used include calcium carbonate, ammonium sulfate, ammonium chloride, and the various trace elements such as manganese, cobalt, zinc, copper, iron and the like.

The CF–1 producing culture, such as the new strain described above, is grown aerobically in a suitable inoculum medium. The inoculum is then transferred and grown in a suitable fermentation medium and the fermentation is carried out at a temperature of about 22° C. to 32° C. for from 48 to 168 hours on a rotary shaker. During the fermentation the pH is usually maintained between about 5.5 and 7.5. After the fermentation is complete, the pH of the mash usually ranges from about 6–7. The mash is then filtered without a pH adjustment. The CF–1 may then be extracted, isolated and purified in any suitable manner.

A preferred extraction process involves filtering the mash at the prevailing pH (6–7). The pH of the filtrate is then adjusted to pH 8–9 with ammonium hydroxide and saturated with ammonium sulfate. A suitable carrier such as Arquad 16, which is a long chain alkyltrimethylammonium chloride in which the alkyl groups consist of 90% hexadecyl, 6% octadecyl and 4% octadecenyl, is added and the mixture is then extracted with a lower alkanol, i.e., n-butanol. The n-butanol extract is then adjusted to pH 1.5–2.0 with concentrated hydrochloric acid and is back-extracted with water and the two phases are separated. The aqueous phase which contains the CF–1 is then concentrated under reduced pressure. The aqueous concentrate is then chromatographed on a diatomaceous earth column in the usual manner the column being developed with a buffered solution of n-butanol. The CF–1 rich cuts are then extracted into water and the back-water extract is concentrated under vacuum, the aqueous extract is then chromatographed on a Florisil column. Florisil is an activated magnesium silicate of approximately the following composition: MgO—15.5%±0.5%; $SiO_2$—84.0%±0.5%; and $Na_2SO_4$—0.5%. The CF–1 is eluted from the Florisil column with methyl alcohol containing a small amount of water. The CF–1 rich cuts are concentrated, adjusted to pH 1 with hydrochloric acid and filtered. The filtrate is cooled and seeded. The resulting crystals of CF–1 are collected by filtration, washed and vacuum dried. The crude product may be purified in a standard manner by recrystallization from 0.1 HCl.

The invention will be described in greater detail in conjunction with the following specific examples.

EXAMPLE 1

Inoculum preparation

A typical medium used to grow the primary inoculum is prepared according to the following formula:

| | |
|---|---|
| Sucrose _____grams__ | 30.0 |
| Corn steep liquor _____milliliters__ | 16.5 |
| Ammonium sulfate _____grams__ | 2.0 |
| Calcium carbonate _____do____ | 7.0 |
| Water to 1000 milliliters. | |

Eight milliliter aliquots of this medium are placed in each of a series of 8 inch test tubes and sterilized by autoclaving for 20 minutes under 15 pounds per square inch pressure. Spores of strain S. aureofaciens W–5 are washed from an agar slant with sterile distilled water to form a suspension containing approximately $60 \times 10^6$ spores per milliliter. A 0.33 milliliter portion of this suspension is used to inoculate each of the tubes containing an 8-milliliter portion of the inoculum medium shown above. The inoculated shaker tube is then incubated for 24 hours at 28° C. on a reciprocating shaker operating at 116 oscillations per minute.

EXAMPLE 2

Fermentation

A fermentation medium is prepared according to the following formula:

| | Grams |
|---|---|
| $(NH_4)_2SO_4$ | 5.0 |
| $CaCO_3$ | 9.0 |
| $NH_4Cl$ | 1.5 |
| $MgCl_2.6H_2O$ | 2.0 |
| $FeSO_4.7H_2O$ | 0.06 |
| $MnSO_4.4H_2O$ | 0.05 |
| $CoCl_2.6H_2O$ | 0.005 |
| $ZnSO_4.7H_2O$ | 0.1 |
| Corn steep | 25.0 |
| Cottonseed meal | 2.0 |
| Corn starch | 55.0 |
| Water to 1000 milliliters. | |

Twenty-five milliliter portions of the medium are placed in 250 milliliter Erlenmeyer flasks, and 0.5 milliliter of lard oil is added to each flask. The flasks containing the fermentation medium and lard oil are sterilized in an autoclave for 20 minutes under 15 pounds per square inch pressure. Following sterilization and cooling, 1 milliliter of the inoculum, prepared as in Example 1, is added to each flask and the fermentation is carried out at 25° C., for 120 hours, on a rotary shaker operating at 180 revolutions per minute. The mash is assayed and found to contain one microgram per milliliter of cosynthetic factor-1.

EXAMPLE 3

Extraction from whole mash

A 200 liter portion of fermentation mash prepared in a pilot tank fermentor with CF–1 producing strain of S. aureofaciens W–5 grown in the medium described in Example 2 and assaying one microgram of CF–1 per milliliter is filtered at pH 6–7 using Hyflo Super-Cel (diatomaceous earth) in an amount approximating 15% of mash volume. The filter cake is washed with sufficient water to give a total combined neutral filtrate volume equal to the starting mash volume. The CF–1 potency of the combined neutral filtrate is about one microgram per milliliter. The combined neutral filtrate is concentrated to one-quarter starting mash volume under vacuum at <60° C. Thus the final volume of concentrated combined neutral filtrate is 50 liters.

The combined neutral filtrate concentrate is adjusted to pH 8–9 with concentrated ammonium hydroxide and then saturated with ammonium sulfate. Arquad 16 (cetyltrimethylammonium chloride) is added to this solution in the proportion of 10 milliliters of a 50% Arquad 16 solution in isopropanol to each liter of combined neutral filtrate concentrate, and the mixture stirred for one-half hour. The mixture is then combined with an equal volume of n-butanol and stirred for another one-half hour. The resultant mixture is centrifuged in order to separate the phases. This extraction is repeated using 10 milliliters of 50% Arquad 16 per liter of combined neutral filtrate concentrate and another equal volume of n-butanol. The n-butanol extracts are then combined to yield a final volume of 100 liters. The combined n-butanol extracts are concentrated to one-quarter starting volume under vacuum at <60° C. Thus the final volume of the concentrated combined n-butanol extracts is 25 liters.

The 25 liters of concentrated, combined n-butanol extracts are adjusted to pH 1.5–2.0 with concentrated hydrochloric acid. A 5-liter quantity of water and 200 liters of methylene chloride are added and the mixture stirred well for one-half hour. The 5-liter aqueous layer is separated from the organic phase. The pH of the 5-liter volume of back water extract is adjusted to 7.0 with ammonium hydroxide solution before it is concentrated under vacuum at <60° C. to 0.5–1.0% of the original fermentation mash volume. One liter of back water extract concentrate is thereby obtained.

ISOLATION

The one-liter portion of back water extract concentrate is mixed thoroughly with unbuffered "Celite 545" (diatomaceous silica) on the basis of 2 grams of Celite 545 per milliliter of concentrate. A Celite 545 column is prepared in the following manner: A phosphate buffer solution is made with 10.75 grams of $K_2HPO_4$ per liter of water and adjusted to pH 8.0 with $H_3PO_4$. Celite 545 is mixed thoroughly with pH 8.0 buffer solution in the proportions of 2 grams of Celite 545 per milliliter of buffer solution. A 9-inch diameter column is packed to a height of 2 feet with this buffered Celite 545. The Celite 545 containing the solution of crude cosynthetic factor-1 (concentrate of back water extract) is packed on top of the buffered Celite 545 column. The column is developed with n-butanol buffered to pH 8.0 as above. The combined CF-1 rich cuts are mixed with an equal volume of water and two volumes of methylene chloride. The mixture is shaken in a separatory funnel. The organic phase is reextracted with another one-half volume of water. The total volume of combined back water extract amounts to 8 liters which is concentrated under vacuum at <40° C. to 200 milliliters.

PURIFICATION

A "Florisil" column is prepared in the following manner: Florisil is packed into a 3-inch diameter column to a height of 18 inches. This column is washed with 0.01 N $NH_4OH$ (aqueous) then with methyl alcohol containing 10% water, and finally with 0.01 N $NH_4OH$ (aqueous) again. The approximately 200 milliliters of combined back water extract concentrate is placed on top of the packed and washed Florisil column and allowed to pass through; followed by a one liter volume of 0.01 N $NH_4OH$ (aqueous) and 500 milliliters of water. Cosynthetic factor-1 is then eluted from this column by means of methyl alcohol containing 10% water. The combined CF-1 rich cuts are adjusted to pH 7.0 with carbon dioxide, then concentrated at less than 40° C. and under vacuum to yield approximately 100 milliliters of an aqueous solution of CF-1.

The combined CF-1 rich concentrate is adjusted to pH 1.0 with hydrochloric acid, heated to 90° C. and filtered through Whatman No. 4 filter paper. The filtrate is cooled, seeded, and allowed to stand overnight at 15° C. The resulting crystals are collected by filtration, washed first with 0.1 N hydrochloric acid solution, then with water, and finally with acetone, followed by ether, and vacuum-dried at 40° C. overnight to obtain 92 milligrams of crude product.

The crude crystals are dissolved in 0.1 N hydrochloric acid solution, heated to 90° C., and cooled in ice-water at about 5° C. to promote crystallization. The newly-formed crystals are first washed with cold (10° C.) 0.1 N hydrochloric acid solution, then with cold water, and dried under vacuum at less than 40° C. for 3 hours to obtain 62 milligrams of the acid form of cosynthetic factor-1, melting with decomposition at 280-285° C. The neutral form of the product is obtained by dissolving 5 milligrams of the acid form of CF-1 in 3 milliliters of hot water by the addition of ammonium hydroxide to pH 7.5. The crystalline neutral form precipitates from solution on cooling. The crystals are washed with cold water and then vacuum dried at 40° C. The chemical analysis of CF-1 and its other chemical, physical, and biological properties have already been described.

EXAMPLE 4

A standard CF-1 assay is set up as follows: An inoculum of S. aureofaciens S1308 (ATCC 12748) is prepared according to the procedure shown in Example 1. Increments of crystalline CF-1 obtained as described in Example 3 are added to a fermentation medium as shown in Example 2 except that 0.1 microgram per milliliter of riboflavin is added thereto. The medium is then sterilized, inoculated with the 24-hour S. aureofaciens S1308 vegetative inoculum, incubated for 120 hours at 25° C., and assayed for the amount of chlortetracycline present.

| CF-1 Added, mcg./ml. | Chlortetracycline Produced (Turbidimetric Assay), mcg./ml. |
|---|---|
| 0 | 360 |
| 0.01 | 925 |
| 0.02 | 1,500 |
| 0.04 | 2,550 |
| 0.08 | 4,270 |
| 0.16 | 5,600 |
| 0.32 | 6,200 |

EXAMPLE 5

120-hour fermentation with S. aureofaciens W-5 is carried out following the procedure of Example 2. The resulting mash is filtered without pH adjustment to obtain a W-5 filtrate.

An S. aureofaciens S1308 fermentation is prepared and carried out as in Example 4 but substituting 0.08 milliliter of this W-5 neutral filtrate for the crystalline CF-1 used in Example 4. The harvest mash assays are as follows:

| Milliliters of W-5 Neutral Filtrate per milliliter of S1308 mash | Chlortetracycline Produced (Turbidimetric Assay) |
|---|---|
| 0.00 | 150 |
| 0.08 | 3,410 |

By comparison of these results with those on pure CF-1 in Example 4 it will be seen that the W-5 mash contains 0.85 microgram of CF-1 per milliliter.

EXAMPLE 6

An S. aureofaciens W-5 neutral filtrate is prepared as described in Example 5. An S. aureofaciens E504 (ATCC 13,191) fermentation is prepared and carried out as in Example 4, but substituting different volumes of the S. aureofaciens W-5 neutral filtrate for the crystalline CF-1 used therein. The harvest mash assays are as follows:

| Milliliters of W-5 Neutral Filtrate per Milliliter of E504 Mash | 7 Chloro 6-Demethyltetracycline Produced | |
|---|---|---|
| | Turbidimetric Assay, mcg./ml. | Spectrophotometric Assay, mcg./ml. |
| 0.00 | <0.5 | <50 |
| 0.04 | 105 | 85 |
| 0.12 | 180 | 170 |

The addition of cosynthetic factor-1 to the above S. aureofaciens fermentation results in the increased production of 7-chloro-6-demethyltetracycline.

EXAMPLE 7

An S. aureofaciens W-5 neutral filtrate is prepared as described in Example 5. Twenty-five milliliter aliquots of the fermentation medium shown in Example 2 are placed in six 250 milliliter Erlenmeyer flasks. An inhibitor of fermentative chlorination, 2,5-dimercapto-1,3,4-thiadiazole (DMTD), is added to two of the six flasks in the proportion of 0.10 milligram of DMTD per milliliter of fermentation medium. All six flasks are then sterilized and cooled. An S. aureofaciens S1308 fermentation is prepared and carried out as in Example 4 but substituting 0.08 milliliter of the *S. aureofaciens* W-5 neutral filtrate for the crystalline CF-1 used therein. The harvest mash assays are as follows:

| Milliliters of W-5 Neutral Filtrate per Milliliter of S1308 Mash | DMTD, mg./ml. | Chlortetracycline Fluorometric Assay, mcg./ml. | Tetracycline Spectrophotometric Assay, mcg./ml. |
|---|---|---|---|
| 0 | 0 | 220 | 0 |
| 0.08 | 0 | 1,420 | 130 |
| 0.08 | 0.10 | 110 | 3,410 |
| 0 | 0 | 280 | 0 |
| 0.08 | 0 | 3,300 | 295 |
| 0.08 | 0.10 | 160 | 3,140 |

The above data show that the addition of cosynthetic factor-1 to an *S. aureofaciens* S1308 fermentation containing a chlorination inhibitor results in the production of tetracycline.

We claim:

1. In a process for the production of an antibiotic of the tetracycline series which comprises growing under aerobic conditions a culture of a species of Streptomyces which produces said antibiotic in an aqueous nutrient medium, the step which comprises growing said organism in said medium in the presence of added cosynthetic factor-1 until substantial antibacterial activity is imparted thereto.

2. A process according to claim 1 in which the compound of the tetracycline series is chlortetracycline.

3. A process according to claim 1 in which the compound of the tetracycline series is tetracycline.

4. A process according to claim 1 in which the compound of the tetracycline series is 7-chloro-6-demethyltetracycline.

5. A process according to claim 1 in which the compound of the tetracycline series is 6-demethyltetracycline.

References Cited in the file of this patent
UNITED STATES PATENTS

| 2,609,329 | Niedercorn | Sept. 2, 1952 |
| 2,709,672 | Petty | May 31, 1955 |